(12) United States Patent
Okushima (10) Patent No.: US 7,150,570 B2
(45) Date of Patent: Dec. 19, 2006

(54) MODULE (75) Inventor: Hiroki Okushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 11/017,721

(22) Filed: Dec. 22, 2004

(65) Prior Publication Data
US 2006/0043089 A1 Mar. 2, 2006

(30) Foreign Application Priority Data
Aug. 27, 2004 (JP) ............................. 2004-248878

(51) Int. Cl.
G02B 6/36 (2006.01)
G02B 6/42 (2006.01)
G02B 6/00 (2006.01)

(52) U.S. Cl. .......................... 385/88; 385/89
(58) Field of Classification Search ................... 385/88
See application file for complete search history.

(56) References Cited

U.S. PATENT DOCUMENTS 6,464,517 B1 * 10/2002 Jones .......................... 439/138

2004/0042193 A1  3/2004 Kirner

FOREIGN PATENT DOCUMENTS

JP  2002-184526  6/2002
JP  2003-347771  12/2003

* cited by examiner

Primary Examiner—Sung Pak
(74) Attorney, Agent, or Firm—Staas & Halsey LLP (57) ABSTRACT A module inserted/withdrawn into/from a mounting device and latched by the mounting device upon insertion, in which a tab disengages a latch with the mounting device by being pulled in the withdrawing direction, a case has an opening on both sides and supporting the tab, a nail goes in/out of the openings of the sides in the inserting direction of the case to engage a latch with the mounting device, a metal fitting is held in a ditch structure provided in the case, and the metal fitting has a hole for loosely engaging a projecting portion provided in the tab in a plate member thinner than a length of the projecting portion and converts a force component in the withdrawing direction applied to the tab through the hole into a force component in a direction substantially perpendicular to the withdrawing direction to displace the nail, thereby disengaging the latch with the mounting device.

12 Claims, 9 Drawing Sheets

MODULE

BACKGROUND OF THE INVENTION

1. Field of the Invention

A present invention relates to a module, and in particular to a latch structure in a module such as a pluggable optical module whose outer structure is prescribed according to MSA (Multi Source Agreement).

2. Description of the Related Art

Figure 7:
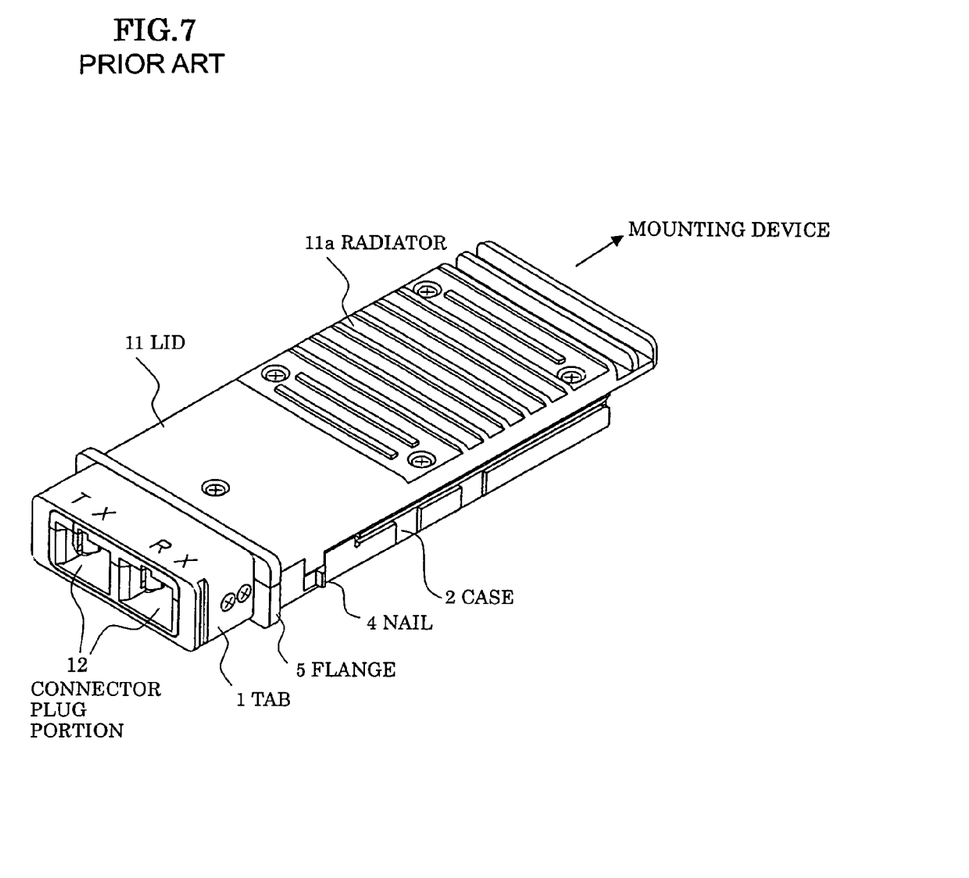
FIG. 7 is an entire squint view of a module according to the present invention and the prior art.
Figure 8:
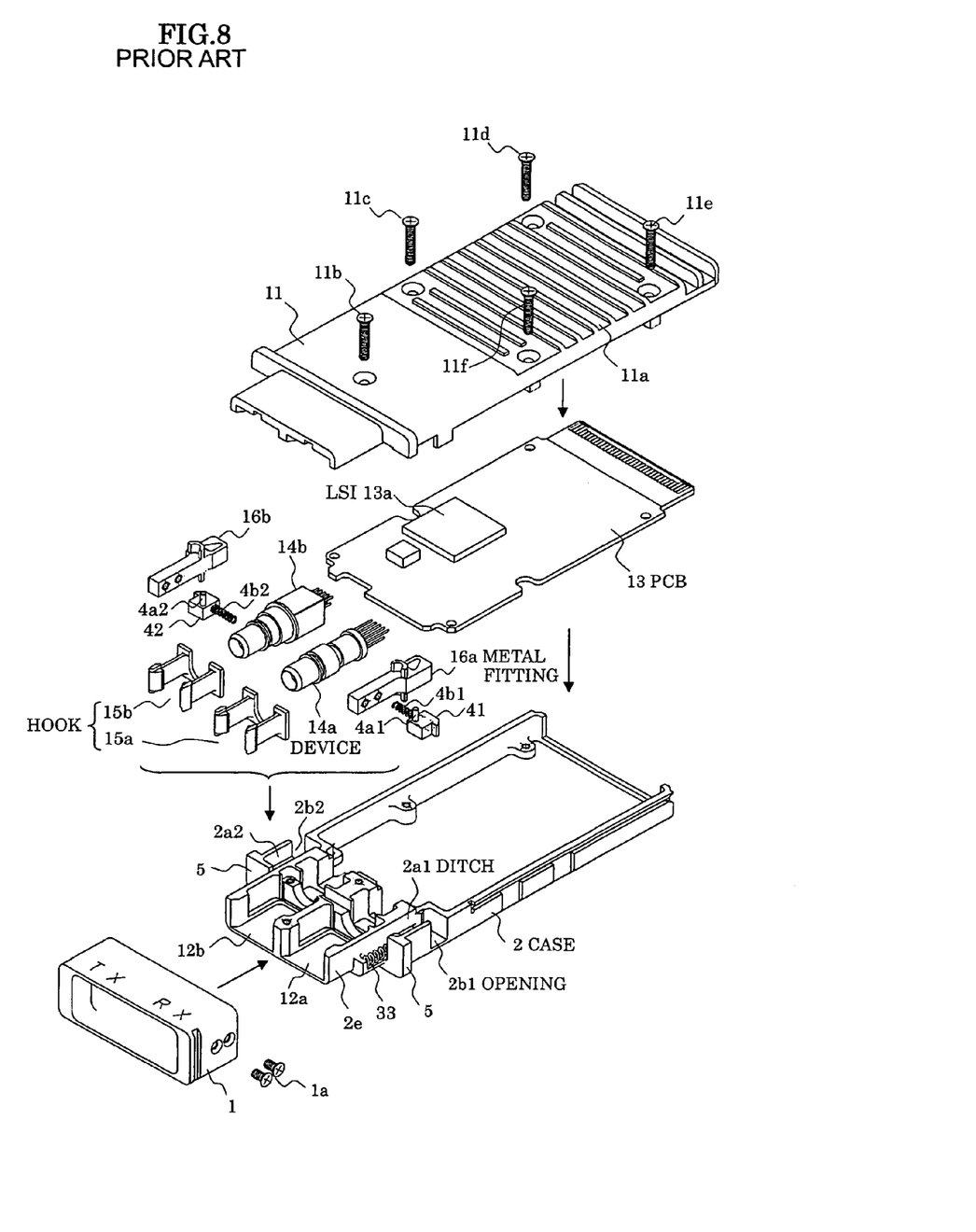
FIG. 8 is an exploded squint view of a prior art module used in a module shown in FIG. 7.

A pluggable optical module is generally known as an optical module which can be easily inserted/withdrawn (or mounted/demounted, mated/demated, engaged/disengaged) into/from rails, connectors, etc. on a mounting device for the module, one example of which is shown in FIGS. 7 and 8.

FIG. 7 shows, an exterior squint view of such a module, which is schematically composed of a tab (or pinch, lug) 1 and a case (housing) 2 and a lid 11. The lid 11 is a roof covering the case 2 and is provided with a radiator 11a. To this case 2, a nail 4 is accessible for engaging a latch between the module and a mounting device (not shown), namely the nail 4 goes in or goes out of the case 2. Between the case 2 and the lid 11, a print circuit board (not shown) is accommodated. The tab 1 and the case 2 are separated by a flange 5, and the tab 1 is provided with a connector plug portion 12 for plugging a transmitting/receiving connector for an optical cable.

FIG. 8 shows an exploded squint view of the module shown in FIG. 7. The tab 1 is fitted over a connector portion 2e in the case 2 comprising connector plug portions 12a, 12b forming the connector plug portion 12. In the connector plug portions 12a, 12b, hooks 15a, 15b are respectively fitted and engaged with optical devices 14a, 14b.

While this pluggable optical module comprises a latching/unlatching structure with a mounting device which enables an insertion/withdrawal into/from rails, connectors, etc. thereon, it is necessary to provide the latching/unlatching structure in a limited area on both sides in the presence of optical parts and electronic parts, as shown in FIG. 8.

The case 2 is provided with ditches (grooves) 2a1, 2a2 near both sides into which metallic fittings 16a, 16b are inserted and held. These metal fittings 16a, 16b are respectively engaged with latching nails (pawls) 41, 42. These nails 41, 42 are respectively provided with pins 4a1, 4a2 and springs 4b1, 4b2, so that springs 33 are engaged with the metal fittings 16a, 16b as accommodated in the ditches 2a1, 2b2 and springs 4b1, 4b2 are respectively engaged with the nails 41, 42, whereby nails 41, 42 go in and go out of openings 2b1, 2b2 provided in the ditches 2a1, 2a2. Namely, by pulling the tab 1 in the direction apart from the case 2, the nails 41, 42 are recessed or withdrawn from the openings 2b1, 2b2, whereby the latch with a fitting portion (not shown) for the rails, etc. on the mounting device is disengaged. To the contrary, by releasing the tab 1, tips of the nails 41, 42 project from the openings 2b1, 2b2 and engage in fitting holes of the rails, etc. on the mounting device to be latched so that the module may not detached.

Also in the case 2, a print circuit board (PCB) 13 mounting thereon an LSI 13a is accommodated. By covering the case 2 having accommodated the print circuit board 13 with the lid 11 and screwing screws 11b–11f, such a module as shown in FIG. 7 is assembled.

Figure 9:
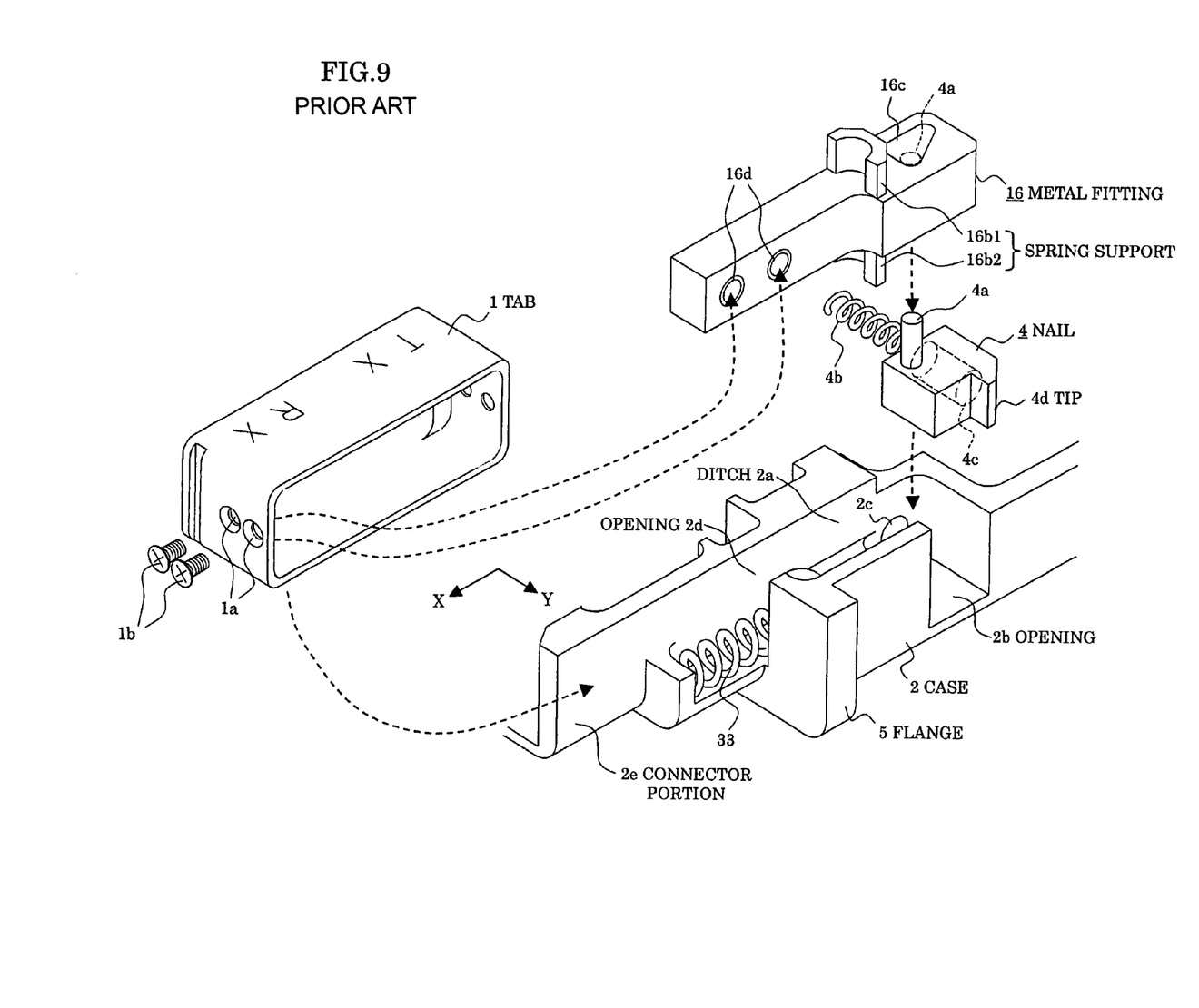
FIG. 9 is an enlarged exploded squint view intelligibly showing in detail a prior art latching structure in a module shown in FIG. 8.

In FIG. 9, a latching structure among the tab 1, the case 2, the nail 4, and the metal fitting 16 shown in FIG. 8 is intelligibly shown in an enlarged view. It is to be noted that while this latching structure is provided on both sides of the case 2 as shown in FIG. 8, for the simplification of figure, only one side is shown so that in FIG. 9, the ditches 2a1, 2a2 are represented by reference numeral "2a", the openings 2b1, 2b2 by a reference numeral "2b", the metal fittings 16a, 16b by a reference numeral "16", the pins 4a1, 4a2 by a reference numeral "4", and the springs 4b1, 4b2 by a reference numeral "4b", respectively in the same manner. This applies to the following descriptions.

Firstly, the nail 4 is inserted into or fitted in the ditch 2a. At this time, the spring 4b is inserted into a blind hole 4c, so that a tip 4d of the nail 4 may go out of the opening 2b by the elastic force of the spring 4b. Under this condition, the metal fitting 16 is also inserted into the ditch 2a so that the pin 4a of the nail 4 may be inserted into a triangular hole 16c provided in the metal fitting 16. At this time, the spring 4b is to be positioned on the right side of a spring support 16b2. Concurrently, a head of the metal fitting 16, which is on the opposite side to the triangle hole 16c, is pulled out of the opening 2d of the ditch 2a, and the spring 33 is engaged with a spring support 16b2. The metallic fitting 16 is further provided with a screw hole 16d to which the screw 1b is fixedly screwed from a screw hole 1a of the tab 1. It is to be noted that the spring support 16b1 is provided so that it may be diverted even on the opposite side of the case 2, which achieves no particular effect in the arrangement of FIG. 9.

After the module having a latch structure thus assembled is latched into the mounting device, the tab 1 is pulled in X direction shown against the elastic force of the spring 33 whereby the metal fitting 16 is concurrently pulled and the pin 4a of the nail 4 moves along a diagonal plane from a position shown by dotted lines within the triangle hole 16c so that a tip 4d of the nail 4 is recessed from the opening 2b against the elastic force of the spring 4d in Y direction perpendicular to X direction, whereby the nail 4 becomes off the rail or the like on the mounting device, disengaging the latch between the case 2 and the mounting device. Namely, the metallic fitting 16 is to convert the pulling force in X direction into a force in Y direction, i.e. to make an XY directional conversion.

In a state where the tab 1 is not pulled, or the tab 1 is released, the metal fitting 16 is returned in the reverse direction to X direction through the spring support 16b2 by the elastic force of the spring 33, so that the pin 4a returns to the position shown by dotted lines in the triangle hole 16c of the metal fitting 16 whereby the tip 4d of the nail 4 projects from the opening 2b to automatically latch into the mounting device. On an occasion where the module is fitted in the rails or the like on the mounting device, an inclined plane provided in the tip 4d of the nail 4 contacts with the rail or the like to automatically withdraw the nail and projects again at the fitting hole to be latched.

Thus, in the state where the tab 1 is not pulled in X direction, the nail 4 projecting out of the side of the case 2 of the module is engaged with the rail or the like on the mounting device, so that the module is not disengaged even in the occurrence of vibrations or the like.

Thus, with the tab 1 being pulled in X direction or released, the nail 4 moves in Y direction perpendicular to X direction, thereby going in and going out of the opening 2b, and engaging or disengaging the latch with the mounting device.

On the other hand, to release a lock by pulling, there is conventionally proposed a connector in which a front and rear pair of sliders are fitted to a male housing and is for movement back and forth by a coil spring; a female housing is provided with a tension arm in addition to a lock arm which can press the front slides at insertion-coupling; detachment of the both housings is carried out by pulling the female housing backward after lock with a lock arm is released; a hook part of the tension arm is locked to a hooked part and the rear slider is pulled forward compressing the coil spring; if pulled to a given extent, lock is released and the female housing is pulled off; when a pulling-off operation is suspended halfway, the rear slider is put back to the rear halting position by resilient force of the coil spring, and the female housing is put back to the proper insertion-coupling position through the tension arm (see e.g. patent document 1).

Also there is proposed an electronic assembling apparatus having guiding planes formed in a connector base orthogonally to the direction of the plugging contacts of the connector base, and having guiding means parallel with a rear wall and provided oppositely to the guiding planes without any idle members in the inside of a assembling housing portion; further, in this electronic assembling apparatus, the dimension of the diameter of each through hole provided in a printed board which serves for fastening the printed wiring board to the inside of the assembling housing portion by each screw is set larger than the diameter of the axial portion of each used screw by a nearly equivalent quantity to the sum of the manufacturing errors of constituents portions intended to be assembled (see e.g. patent document 2).

[Patent document 1] Japanese patent application laid-open No. 2002-184526

[Patent document 2] Japanese patent application laid-open No. 2003-347771

However, the prior art as shown in FIG. 9 in such a module having a latching/unlatching structure in a limited area in the existence of optical parts and electronic part has the following disadvantages;

(1) Since the tab is fixed with the metallic fitting by screws, even a little displacement of the pulling direction of the tab from X direction will effect on the force component toward Y direction, which makes the stroke or displacement of the nail insufficient, disabling the latch with the mounting device to be disengaged.

Also, the position of the tab held may be displaced from the position where a metallic fitting applies the force to the pin of the nail. Frequently repeated operations of the tab will loose the screws to decline the tab and make members rub each other and difficult to be moved, which will also reduce the displacement of the nail in Y direction. Furthermore, mutual rubs between members will shorten the life due to wear.

(2) On the other hand, it is conceivable in the prior art shown in FIG. 9 that the above problem (1) is solved by supposing that the screw hole 16d provided in the metal fitting 16 is formed as for example a blind hole, which is engaged with the projecting portion of the screw 1b projecting inside the tab 1 through the screw hole 1a, and the metal fitting 16 is pulled together with the tab 1.

However, this concept would require a fixed width for performing the XY directional conversion in the triangle hole 16c of the metal fitting 16, so that the metal fittings 16 also requires the same width. Also, due to restrictions for the length of the screw 1b projecting from the tab 1, the projecting portion of the screw 1b lacks the pulling force for the metallic fitting 16 through the blind hole 16a, in which the pulling force in X direction is not sufficiently transferred to that in Y direction, thereby lacking the stroke of the metallic fitting 16 for displacing the nail in Y direction. Accordingly, in view of the size of rails provided on the mounting device being prescribed according to MSA, the above concept would not meet the requirement that the latching stroke of the nail 4 be larger than a fixed value.

(3) Because of the metallic fitting being fixed inside the tab, the mounting angle of the metal fitting is effected by the precision of engaged face of the tab with respect to the case. Therefore, the opening angle of the tab will be varied to worsen the movement of the nail due to the contact with the inside face of the ditch of the case, resulting in a difficulty in assembly.

(4) There are a large number of parts such as springs for moving the nail, springs for returning the tab, and a metal fitting for transferring forces, which becomes a factor of cost increases.

SUMMARY OF THE INVENTION

It is accordingly an object of the present invention to provide a module having a latch structure which enables frictions between a case and a metal fitting to be lowered, a displacement (amount) of a nail for engaging a latch between a mounting device and the case to be enlarged, the assembly to be easily made, and the number of parts to be reduced.

The present invention is made taking notice that the above problems are solved by such a structure that the metal fitting is loosely engaged with or hooked by the tab without fixing the tab with the metal fitting, thereby performing the XY directional conversion for transferring the force.

For the achievement of the above object, the present invention provides, a module which is capable of being inserted/withdrawn into/from a mounting device and latched by the mounting device upon insertion, comprising: a tab disengaging a latch with the mounting device by being pulled in the withdrawing direction; a case having an opening on both sides and supporting the tab; a nail going in/out of the openings of the sides in the inserting direction of the case to engage a latch with the mounting device; and a metal fitting held in a ditch structure provided in the case; wherein the metal fitting has a hole for loosely engaging a projecting portion provided in the tab in a plate member thinner than a length of the projecting portion, and converts a force component in the withdrawing direction applied to the tab through the hole into a force component in a direction substantially perpendicular to the withdrawing direction to displace the nail, thereby disengaging the latch with the mounting device.

Namely, a metal fitting held in a ditch structure provided in a case employs a plate member thinner than the length of a projecting portion of a tab, and is provided with a hole only for loosely engaging or hooking the projecting portion in the plate member. When the tab is pulled in the above-noted X direction, a substantial component of the pulling force is converted (XX directional conversion) into a force component in Y direction perpendicular to X direction to be provided to a nail, so that a wobbly condition in X direction can be absorbed and a displacement in Y direction can be sufficiently secured, whereby the XY conversion is enabled in a state where unnecessary frictions between the ditch structure and the metal fitting are reduced, facilitating the engagement/disengagement with the mounting device.

The above metallic fitting may be composed of an L-shaped plate member and a block member; the L-shaped plate member has a first portion with the hole and a second portion pulling the block member in a same direction as the tab is pulled, and the block member has a first portion pulled by the second portion of the L-shaped plate member, and a second portion moving a projecting portion provided in the nail for the conversion when the first portion is pulled by the second portion of the L-shaped plate member.

Also, the metallic fitting may further comprise a spring member which always gives a force in a reverse direction to the pulling direction to the second portion of the L-shaped plate member, and the nail may further comprise a spring member which always gives itself a force in a direction for the latch.

Also, the metallic fitting may be composed of a first and a second L-shaped members; the first L-shaped member is a plate member having a first portion with the hole and a second portion pulling the second L-shaped member in a same direction as the tab is pulled, and the second L-shaped member has a first portion pulled by the second portion of the first L-shaped member, and a second portion moving along a diagonal groove provided in the nail when the first portion is pulled by the second portion of the first L-shaped member, thereby performing the conversion.

Also, the metal fitting may further comprise a spring member which always gives a force in a reverse direction to the pulling direction to the second portion of the first L-shaped member, and the spring member may concurrently give the nail a force in a direction for the latch.

This enables the spring member to be used in common both in X directional displacement of the metallic hitting and in Y directional displacement of the nail.

Also, the metal fitting may be composed of a first and a second plate members; the first plate member has a first portion with the hole, and a second portion generating an elastic force to the second plate member when the tab is pulled, and the second plate member has a first portion for fixation, and a second portion moving along a groove provided in the nail when the elastic force is generated by the second portion of the first plate member, thereby forming the conversion.

Furthermore, the second plate member may comprise a leaf spring which provides a force in a reverse direction to the pulling direction to the second portion of the first plate member by the elastic force generated at the second portion thereof, and concurrently provides the nail a force in a direction for the latch.

This precludes the spring member in X direction and enables only the leaf spring for Y direction to be used in common to X direction.

Furthermore, the metallic fitting may be a leaf spring which has a bended portion with the hole, and a fixing L-shaped portion which engages with a projecting portion provided in the nail at a coupling portion with the bended portion and is deformed so that the bended portion approaches a straight line when the tab is pulled, thereby performing the conversion through the projecting portion.

This leaf spring can provide a force in a direction for latching the nail through the L-shaped portion when the bended portion is returned by releasing the tab.

Therefore, this spring as a unit can provide elastic forces both in X direction and Y direction.

Furthermore, the projecting portion may be a pin which is a screw or a press-fitting pin penetrating from both outsides to an inside of the tab.

Furthermore, the case may have a connector fitting portion, and the tab may be fitted into the case so as to enclose the fitting portion, whereby the connector is connectable to electronic circuits in the case through the fitting portion.

The present invention also provides a module comprising: a nail going in/out of a case in order to engage a latch with a mounting device; a tab which is pulled to disengage a latch between the nail and the mounting device and has holes on both sides for the pulling; and a metal fitting held in a ditch structure provided in the case; wherein the metal fitting has projecting portions loosely engaging in the holes in a plate member longer than a length of the holes, and converts a force component in a direction of pulling the tab through the projecting portion into a force component in a direction substantially perpendicular to the pulling direction to be provided to the nail, thereby disengaging the latch with the mounting device.

Namely, this is a module where a hole is substituted for the projecting portion provided in the tab and the projecting portion is substituted for the hole provided in the metal fitting.

According to the present invention, it becomes possible to convert a force when pulling the tab into a latching displacement of the nail in a perpendicular direction through the metallic fitting without wastes, thereby easily disengaging the latch with the mounting device. Because of less frictions between the metal fitting and the case, the members do not wear out and the lives thereof are extended. Since the precision of the engaging face of the tab or metal fitting is eased, the assembly is facilitated. Also, common use of the spring members enables the number of parts to be reduced and the cost to be lowered.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Hereinafter, embodiments of a module according to the present invention will be described referring to the attached drawings. A module according to the invention is related to a latching/unlatching structure with a mounting device in a module which can be easily inserted/withdrawn into/from rails, connectors, etc. thereon as shown in FIG. 8.

Embodiment (1)

Figures 1A, 1B:
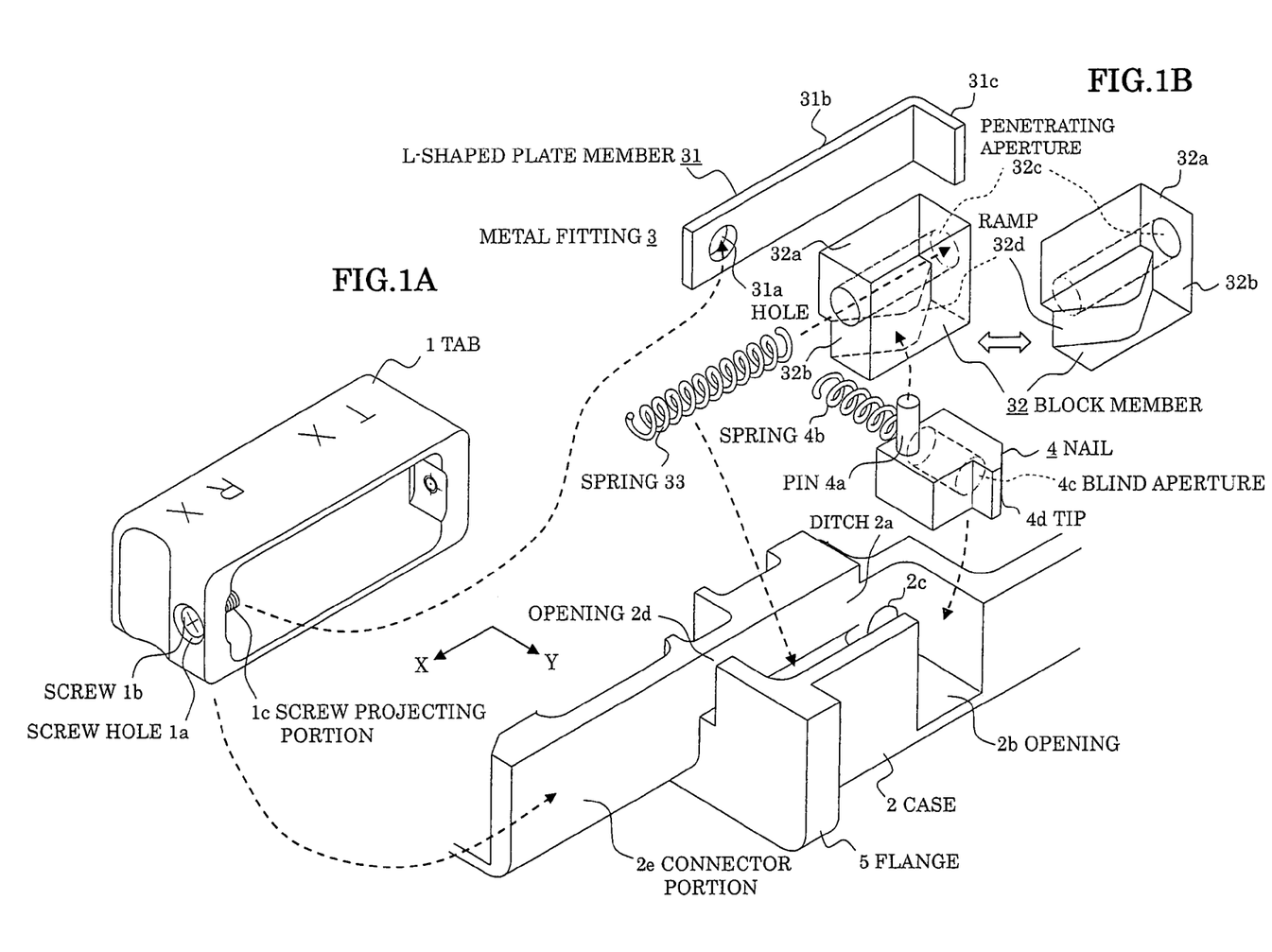
FIGS. 1A and 1B are exploded squint views showing a latching structure in an embodiment (1) of a module according to the present invention.

FIG. 1A shows an embodiment (1) of a module according to the present invention, which is schematically composed of a tab 1, a case 2, a metal fitting 3 and a nail 4, and illustrates a latching structure only on one side of the case 2 shown in FIG. 8. The case 2 is provided with a ditch 2a, in which the nail 4 is fitted in or inserted into the ditch 2a and a spring 4b is inserted into a blind hole 2c, whereby the nail 4 is always pressed toward Y direction as shown to project a tip 4d from an opening 2b.

In the ditch 2a in which the nail 4 has been fitted, the metal fitting 3 is further fitted in or inserted into a space above the nail 4. The metallic fitting 3 is composed of an L-shaped plate member 31 and a block member 32. The L-shaped member 31 comprises a first portion 31b provided with a hole (loose hole) 31a for only loosely engaging or hooking a screw projecting portion 1c appearing as a screw 1b is screwed from a screw hole 1a of the tab 1, and a second portion 31c for pulling the block member 32 in X direction. The block member 32 is composed of a first portion 32a and a second portion 32b, in which the first portion 32a is provided with a penetrating aperture (hole) 32c, and a spring 33 is inserted into the penetrating aperture 32c up to contacting the second portion 31c of the L-shaped member 31. The opposite end of the spring 33 is stopped by a flange 5 of the case 2. The second portion 32b is provided with a ramp 32d shown by dotted lines. This ramp 32d has slope surfaces declined from both sides as shown in a sprint view as seen from the opposite side shown by solid lines in FIG. 1B.

It is to be noted that the width of the block member 32 in Y direction should be smaller than the space accommodating the block member 32 but made substantially equal to the width of the space, thereby suppressing the movements in Y direction.

It is also to be noted that the ramp 32d of the block member is declined toward the center from both sides thereof because as shown in FIG. 8, the latching structure in FIG. 1 is to be provided on both sides of the case 2, so that the metal fitting 3 may be mounted on either side for the common use.

A pin 4a of the nail 4 is arranged in contact with the ramp 32d, and is always subject to an elastic force of the spring 4b in Y direction, so that the pin 4a moves along the ramp 32d in relation to the movement of the block member 32 in X direction.

The L-shaped plate member 31 has such a length that the block member 32 is pulled by the second portion 31c and the opposite side end projects from the opening 2d of the ditch 2a to make the hole 31a loosely engage the screw projecting portion 1c.

Consequently, the L-shaped plate member 31 extends from the opening 2d of the ditch 2a, and the spring 33 penetrates through the penetrating aperture 32c of the block member 32 and contacts the second portion 32c of the L-shaped plate member 31, and the opposite side of the spring 33 is stopped by the flange 5, so that the L-shaped plate member 31 is always subject to a force to push it in the opposite direction to X direction.

The tab 1 is engaged over a connector portion 2e of the case 2 projecting from the flange 5 so that the screw projecting portion 1c appearing inside the tab 1 may loosely engage in the hole 31a of the L-shaped member 31.

In the latching structure thus assembled, for the module shown in FIG. 7, the nail 4 projects from the case 2 and is latched into the rail or the like of the mounting device (not shown), whereby the case 2 is latched with the mounting device through the nail 4.

When the tab 1 is pulled for disengaging the latch with the mounting device, the pulling force is transferred to the hole 31 of the L-shaped member 31 through the screw projecting portion 1c and makes the second portion 31c of the L-shaped plate member 31 pull the block member 32 in X direction. This raises the pin 4a of the nail 4 having initially positioned at the lowest declined portion (center) of the ramp 32d before the pulling along the ramp, and gradually withdraw or recess a tip 4d of the nail 4 from the opening 2d correspondingly. When the tab 1 is pulled up to a state where the tip 4d of the nail 4 hardly projects from the opening 4b, the latch with the mounting device becomes disengaged to enable the module to be demounted from the mounting device.

When releasing the tab 1, the second portion 31c of the L-shaped plate member 31 of the metal fitting 3 is returned in the opposite direction to X direction by the elastic force of the spring 33, so that the pin 4a of the nail 4 now goes down along the ramp 32d and stops at the lowest declined portion. This is followed by that the tip 4d of the nail 4 is gradually projecting from the opening 2d and the diagonal surface of the tip 4d is engaged in a fitting aperture (not shown) of the rail on the mounting device.

Thus, in this embodiment (1), a force component at the time when pulling the tab 1 in X direction is transferred to the L-shaped plate member 31 through the screw projecting portion 1c and the hole 31a, with a wobbly motion of the tab 1 in X direction being absorbed. Since a substantial force component in Y direction perpendicular to X direction can be provided, a force after an XY directional conversion without wastes can be provided to the nail 4. Namely, only with the hole 31a of the L-shaped plate member 31 of the metal fitting 3 being loosely engaged with the screw projecting portion 1c of the tab 1, it becomes possible to provide a force in a Y axis direction required for the nail 4.

Embodiment (2)

Figure 2:
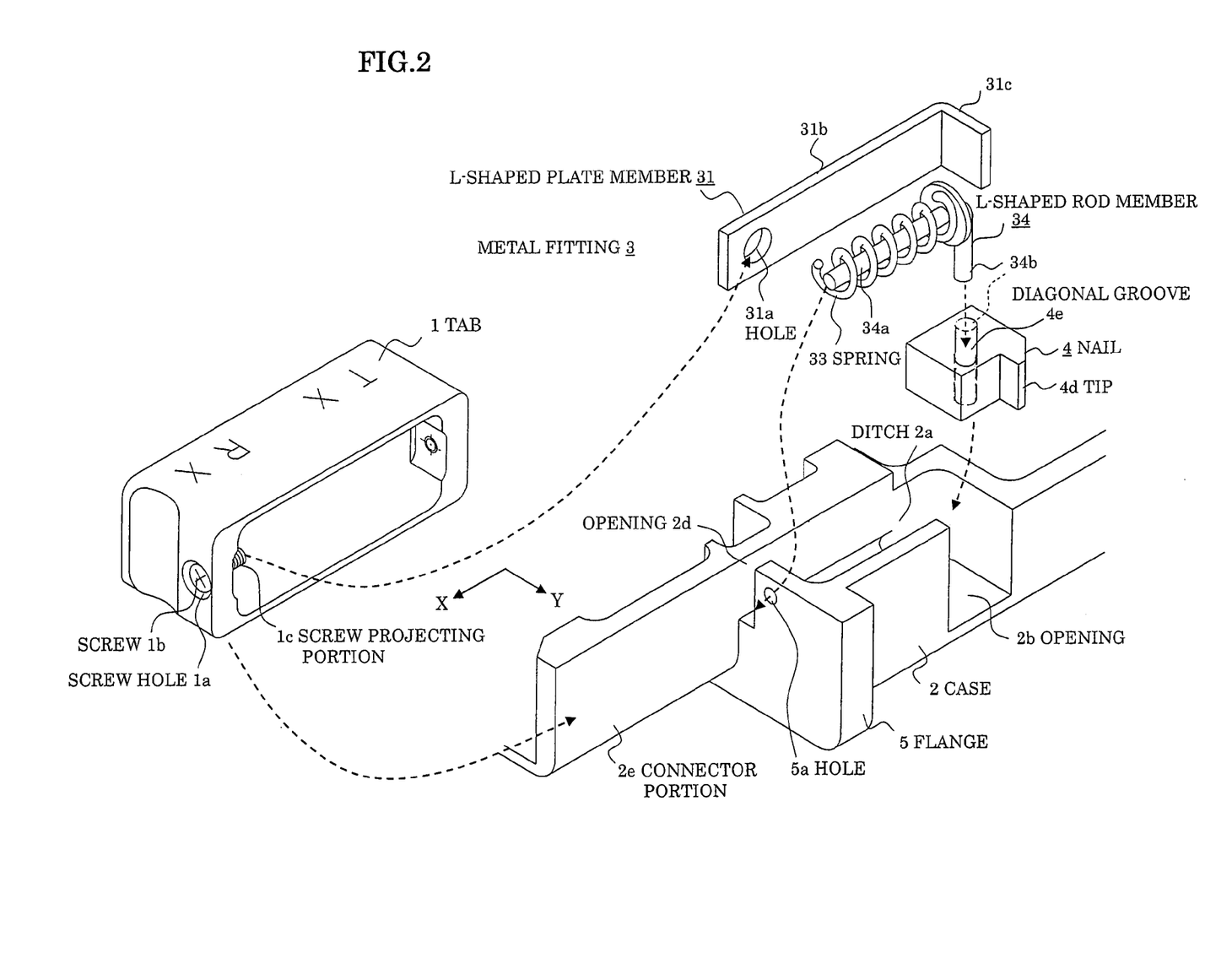
FIG. 2 is an exploded squint view showing a latching structure in an embodiment (2) of a module according to the present invention.

FIG. 2 shows an embodiment (2) of a module according to the present invention, which is different as compared with the embodiment (1) in that the metallic fitting 3 similarly employs the L-shaped plate member 31 but substitutes an L-shaped rod member 34 for the block member 32, and the nail 4 does not employ the pin 4a and the spring 4b in FIG. 1 but employs a diagonal groove 4e. More specifically, the L-shaped rod member 34 is composed of a first portion 34a and a second portion 34b, in which the first portion 34a contacts with the second portion 31c of the L-shaped plate member 31 and is covered with a spring 33 one end of which is stopped by the flange 5, and is movable in X axis direction through a hole 5a provided in the flange 5; the second portion 34b anchors to the other end of the spring 33 and is to be inserted into the diagonal groove 4e of the nail 4, thereby moving along the diagonal groove.

In such a latch structure, a state where the tab is not pulled assumes a state where the second portion 31c of the L-shaped member 31 is pushed in the opposite direction to X direction through the first portion 34a of the L-shaped rod member 34 by the elastic force of the spring 33, and thus the tab 1 is mated into the connector portion 2e. In this state, the second portion 34b of the L-shaped rod member 34 reaches the position shown by dotted lines, so that the tip 4d of the nail 4 projects from the opening 2b, enabling a latch with the mounting device.

In the latching state with the mounting device, when the tab 1 is pulled, the screw projecting portion 1*c* loosely engages in the hole 31*a* of the L-shaped member 31, whereby the second portion 31*c* of the L-shaped member 31 pulls the second portion 34*b* of the L-shaped rod member 34 against the elastic force of the spring 33. This enables the second portion 34*b* of the L-shaped rod member 34 at the position shown by dotted lines in the diagonal groove 4*e* to gradually move downward as seen from the figure along the diagonal groove 4*e*, so that the nail 4 is relatively going inside the ditch 2*a* of the case 2, and in the end the tip 4*d* does not project from the opening 2*b* where the latch between the case 2 and the mounting device is disengaged.

Thus, in this embodiment (2), although pulling the tab 1 in X direction provides a Y axis component in the pulling direction, the Y axis component (wobbly motion component in X direction) is absorbed at the hole 31*a* of the L-shaped member 31 and substantially converted into an X directional movement. Since this pulling force is further provided to the nail 4 through the second portion 34*b* of the L-shaped rod member 34 and the diagonal groove 4*e*, the nail 4 goes in/out of the opening 2*b* of the case 2 in the form where the X axis force component is converted into a substantially Y axis component. Therefore, the metal fitting 3 can disengage the latch with the mounting device without providing unnecessary frictions to the ditch 2*a* of the case 2.

It is to be noted that in this embodiment (2), the spring member can be composed of only the spring 33 which provides the elastic force in Y direction in cooperation with the diagonal groove 4*e*.

Embodiment (3)

Figure 3:
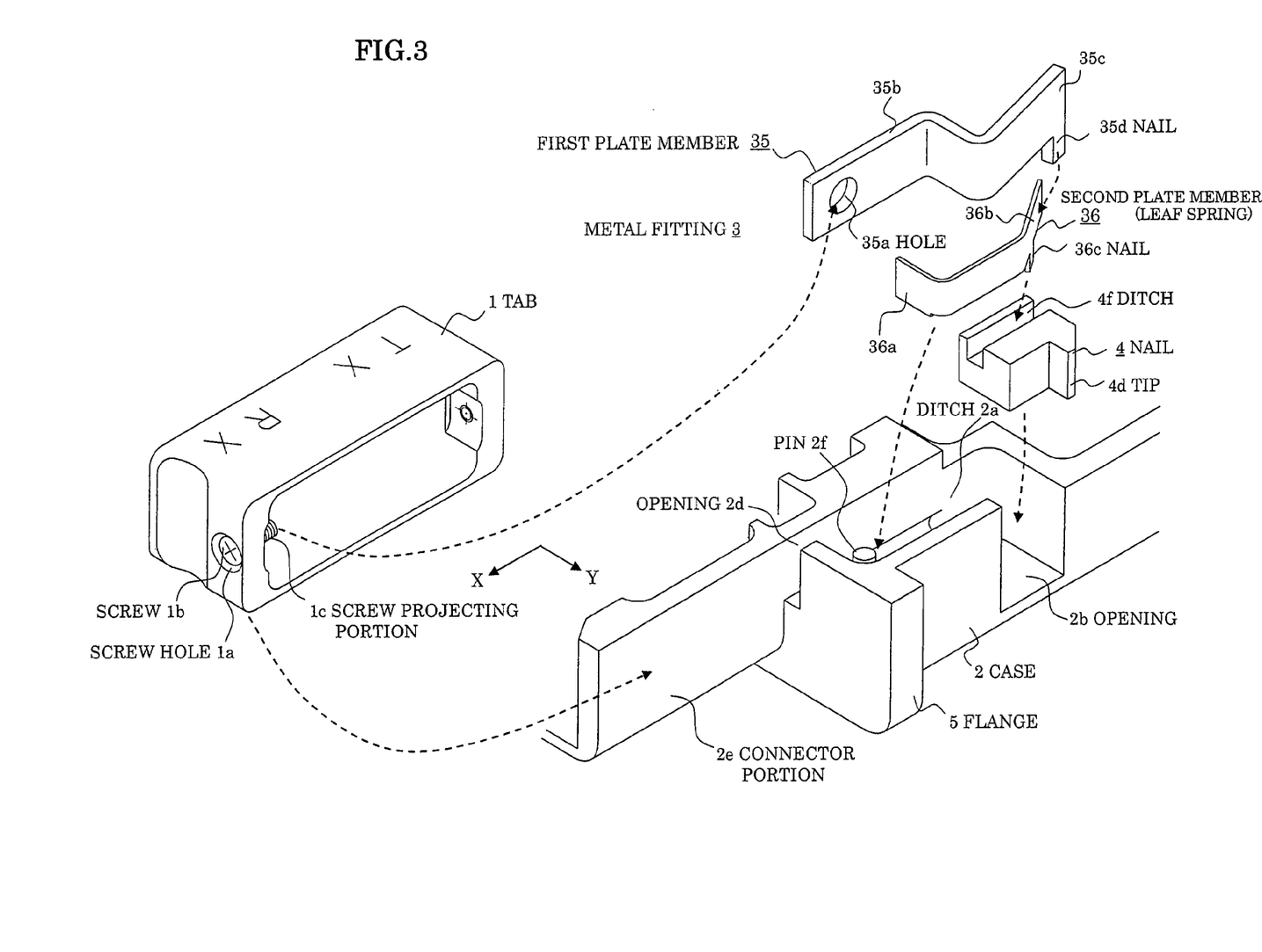
FIG. 3 is an exploded squint view showing a latching structure in an embodiment (3) of a module according to the present invention.

FIG. 3 shows an embodiment (3) of a module according to the present invention, which employs two members for the metallic fitting 3 in the same matter as the above-noted embodiments (1) and (2), where a first plate member 35 is a leaf spring in a z-shape having a first portion 35*b* with a hole 35*a* loosely engaging the screw projecting portion 1*c* and a second portion 35*c* connected to the first portion 35*b*; a second plate member 36 is a leaf spring having a first portion 36*a* of L-shaped plate member and a second portion 36*b* to be engaged with a nail 35*d* provided in the second portion 35*c* of the first plate member 35. It is assembled such that the first portion 36*a* of the leaf spring 36 is inserted into and fitted in a space between a pin 2*f* provided in the ditch 2*a*, the flange 5, and the case 2, the first plate member 35 is mounted above the leaf spring 36, and a nail 35*d* contacts the second portion 36*b* of the leaf spring 36 from the direction of the dotted line arrow for a loose engagement. It is also assembled such that a nail 36*c* provided in the second portion 36*b* of the leaf spring 36 engages with a ditch 4*f* in a straight shape provided in the nail 4. It is to be noted that the bending angle of the second portion 35*c* of the first plate member 35 is set to be larger than that of the second portion 36*b* of the second plate member 36*c*, thereby generating an elastic force in the second portion 36*b*.

In the latching structure thus assembled, since the nail 35*d* of the first plate member 35 does not give a pushing force to the second portion 36*b* of the leaf spring 36 when the tab is not pulled or released, the nail 36*c* of the second portion 36*d* serves to project the tip 4*d* from the opening 2*b* through the ditch 4*f*. Therefore, this enables the latch with the mounting device.

On the other hand, when the tab is pulled in X direction, the nail 35*d* of the first plate member 35 is to push the second portion 36*b* of the leaf spring 36, so that an elastic force is generated at the second portion 36*b*, and the nail 36*c* of the second portion 36*b* is to move in the reverse direction to Y direction, whereby the nail 4 is gradually going in from the opening 2*d*, and in the end is withdrawn up to the position where the latch is disengaged with the mounting device.

By releasing the tab 1, based on the elastic force generated at the second portion 36*b* of the leaf spring 36, the nail 36*c* thereof pushes the nail 4 in Y direction through the ditch 4*f*, so that the tip 4*d* of the nail 4 projects from the opening 2*b*, enabling the latch with the mounting device.

Thus, also in this embodiment (3), even if the pulling force of the tab 1 in X direction includes a Y axis component, the engagement between the screw projecting portion 1*c* and the hole 35*a* moves the first plate member 35 of the metallic fitting 3 substantially in X access direction, so that the nail 4 moved by the elastic force of the leaf spring 36 in Y axis direction is limited only to a motion in substantially Y axis direction. Therefore, it becomes possible to eliminate a latching displacement defect of the nail due to unnecessary frictions between the metallic fitting 3 and the ditch 2*a*.

It is to be noted that in this embodiment (3), the spring member may be composed only of the leaf spring 3*b* which provides elastic forces in both of X and Y directions.

Embodiment (4)

Figure 4:
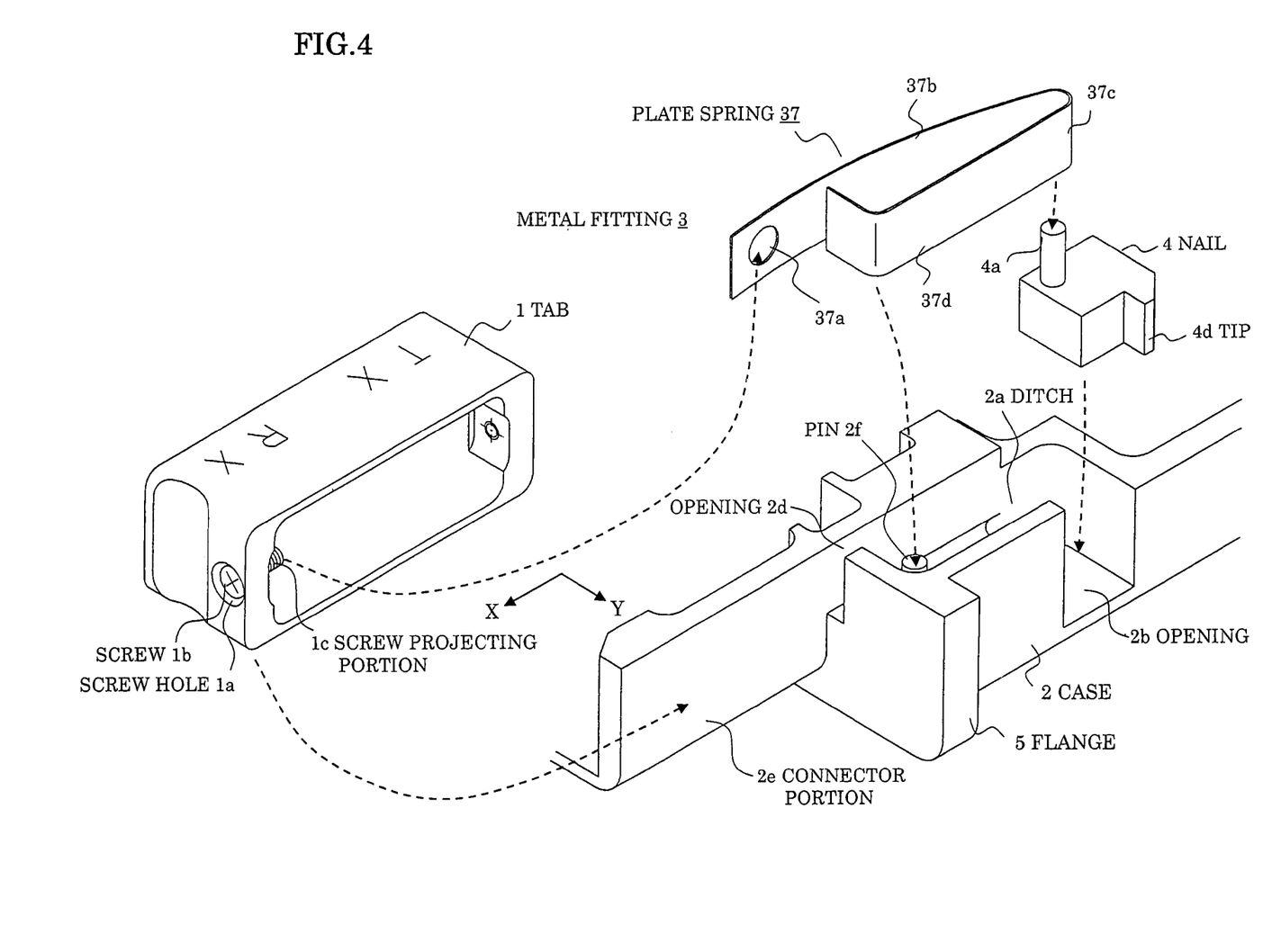
FIG. 4 is an exploded squint view showing a latching structure in an embodiment (4) of a module according to the present invention.

FIG. 4 shows an embodiment (4) of a module according to the present invention, which is different from the above-noted embodiments (1)–(3) in that the metallic fitting 3 only employs a leaf spring 37 that is one member. Namely, this metallic fitting 3 is composed of a bended portion 37*b* in a mild R-shape having a hole 37*a* loosely engaging the screw projecting portion 1*c*, an L-shaped portion 37*b*, and a coupling portion 37*c* for coupling the bended portion 37*b* and the L-shaped portion 37*d* where the leaf spring 37 is folded at a near center by 150–170°. The L-shaped portion 37*d* is inserted into a space between the pin 2*f* provided in the ditch 2*a*, the flange 5, and the case 2 to fix the leaf string 47. In the same manner as the first portion 36*a* of a leaf string 36 in the above-embodiment (3), the coupling portion 37*c* engages with a pin 4*a* provided in the nail 4.

The operation of the latching structure thus assembled will now be described referring to FIGS. 5A and 5B.

Figure 5A:
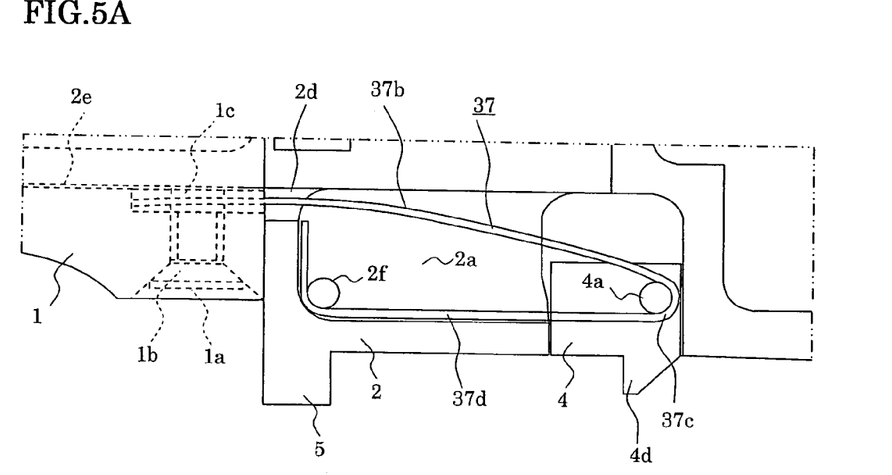
FIGS. 5A and 5B are plan views for describing an operation of an embodiment (4) of the present invention shown in FIG. 4.

FIG. 5A shows a state in a plan view where the tab is not pulled in the latching structure. Namely, the bended portion 37*b* of the leaf spring 37 in a normal state where the screw projecting portion 1*c* of the tab 1 loosely engages in the hole 37*a* has such a function that the coupling portion 37*c* pushes down the pin 4*a* to the lowest portion as seen from the figure. This enables the tip 4*b* of the nail 4 to project from the opening 2*b* for the engagement with the mounting device.

Figure 5B:
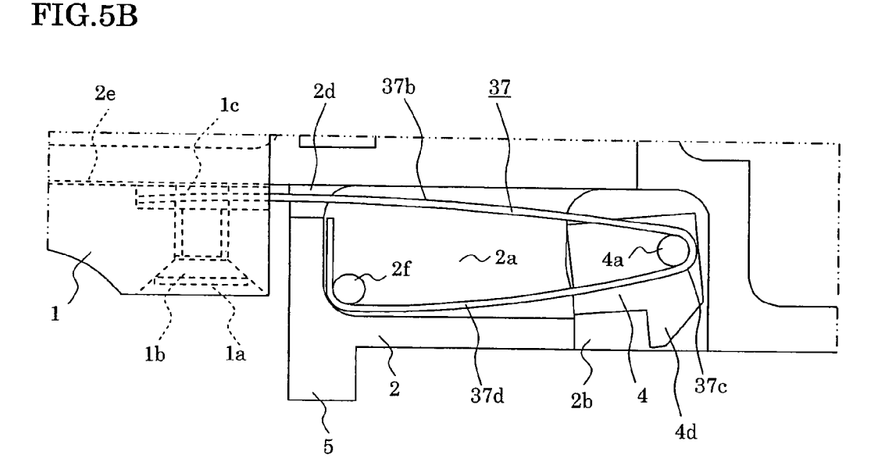

This state assumes a state shown in FIG. 5B where the tab 1 is pulled. Namely, pulling the tab 1 further pulls the bended portion 37*b* of the leaf spring 37 through the screw projecting portion 1*c* and the hole 37*a* so that the bended portion may approach a straight line. In connection with this, the pin 4*a* of the nail 4 engaged with the coupling portion 37*c* is going to be pulled up to the upper portion as seen from the figure, thereby assuming a state where it is withdrawn from the opening 2*b* as shown, which disengages a latch between the case 2 and the mounting device.

Also, in this embodiment (4), when the tab 1 is pulled, the leaf spring 37 is bended with the screw projecting portion 1*c* only loosely engaging in the hole 37*a* being centered, together with this bend a force in Y axis direction from the pin 4*a* is transferred to the nail 4 to withdraw the nail 4, so that even if the tab 1 is pulled including such a Y axis component, the leaf spring 37 can provide to the nail 4 a pulling force only of a substantially X axis component in a state where the Y axis component is absorbed. Accordingly, with a sufficient pulling force, it becomes possible to eliminate a latching displacement defect of the nail in a form where a force in the Y axis component is not reduced due to frictions, etc.

Modification of Engagement Structure

Figure 6A:
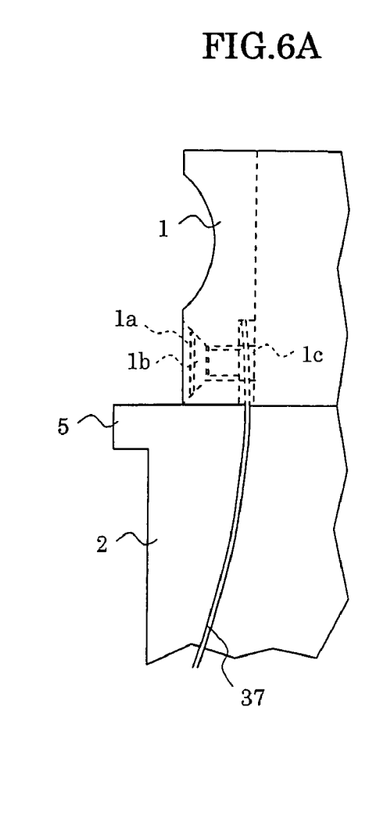
FIGS. 6A–6D are diagrams showing engaging or hooking structure examples between a tab and a metal fitting in a module according to the present invention.
Figure 6B:
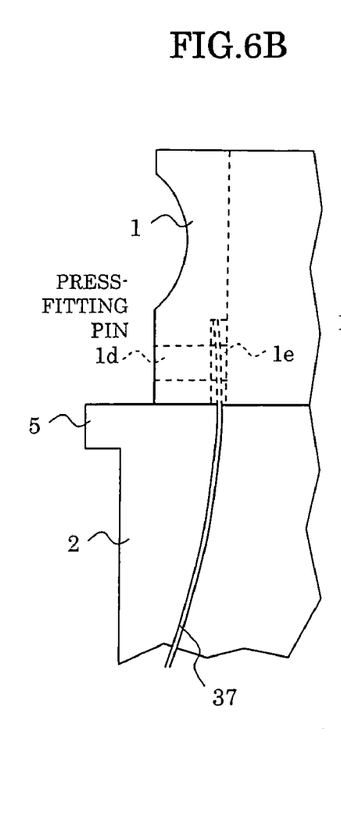

FIGS. 6A and 6B show modifications of the above embodiment (4) for the engagement relationship (structure) between the screw projecting portion and the metal fitting in the latch between the tab 1 and the case 2, which can be similarly applied to the other embodiments (1)–(3).

Figure 6C:
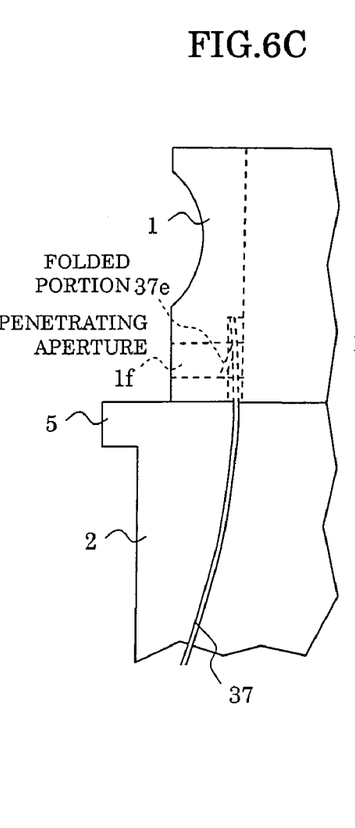
Figure 6D:
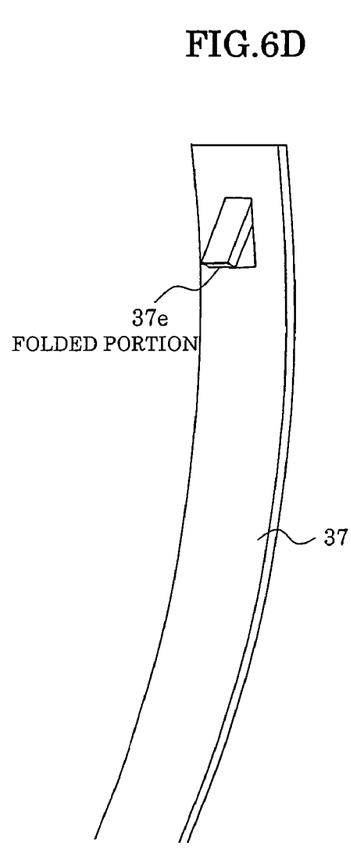

In the case of FIG. 6A, there is shown a state where the hole 37a in the leaf spring 37 of the metal fitting 3 loosely engages the projecting portion 1c when the screw 1b is screwed into the screw hole 1a in the same manner as the above embodiments (1)–(4) shown. The case of FIG. 6B is different therefrom in that a press-fitting pin 1d is substituted for the screw to project a part of the press-fitting pin 1d as a projecting portion 1e. It is also possible to provide an engagement structure where screws or press-fitting pins are not inserted as shown in FIG. 6C, or where the plate member 37 having a folded portion 37e as shown in FIG. 6D is inserted into a penetrating aperture 1f for the loose engagement.

The invention claimed is:

1. A module which is capable of being inserted/withdrawn into/from a mounting device and latched by the mounting device upon insertion, comprising:
a tab disengaging the module from a latched state with the mounting device by being pulled in the withdrawing direction;
a case having an opening on both sides and supporting the tab;
a nail going in/out of the openings of the sides in the inserting direction of the case to put the module in the latched state with the mounting device; and
a metal fitting held in a ditch structure provided in the case; wherein
the metal fitting has a hole for loosely engaging a projecting portion provided in the tab in a plate member thinner than a length of the projecting portion, and converts a force component in the withdrawing direction applied to the tab through the hole into a force component in a direction substantially perpendicular to the withdrawing direction to displace the nail, thereby disengaging the module from the latched state with the mounting device.

2. The module as claimed in claim 1, wherein the metallic fitting is composed of an L-shaped plate member and a block member; the L-shaped plate member has a first portion with the hole and a second portion pulling the block member in a same direction as the tab is pulled, and the block member has a first portion pulled by the second portion of the L-shaped plate member, and a second portion moving a projecting portion provided in the nail for the conversion when the first portion is pulled by the second portion of the L-shaped plate member.

3. The module as claimed in claim 2, wherein the metallic fitting further comprises a spring member which always gives a force in a reverse direction to the pulling direction to the second portion of the L-shaped plate member, and the nail further comprises a spring member which always gives the nail a force in a direction for the latched state.

4. The module as claimed in claim 1, wherein the metallic fitting is composed of a first and a second L-shaped members; the first L-shaped member is a plate member having a first portion with the hole and a second portion pulling the second L-shaped member in a same direction as the tab is pulled, and the second L-shaped member has a first portion pulled by the second portion of the first L-shaped member, and a second portion moving along a diagonal groove provided in the nail when the first portion is pulled by the second portion of the first L-shaped member, thereby performing the conversion.

5. The module as claimed in claim 4, wherein the metal fitting further comprises a spring member which always gives a force in a reverse direction to the pulling direction to the second portion of the first L-shaped member, and the spring member concurrently gives the nail a force in a direction for the latched state.

6. The module as claimed in claim 1, wherein the metal fitting is composed of a first and a second plate members; the first plate member has a first portion with the hole, and a second portion generating an elastic force to the second plate member when the tab is pulled, and the second plate member has a first portion for fixation, and a second portion moving along a groove provided in the nail when the elastic force is generated by the second portion of the first plate member, thereby forming the conversion.

7. The module as claimed in claim 6, wherein the second plate member comprises a leaf spring which provides a force in a reverse direction to the pulling direction to the second portion of the first plate member by the elastic force generated at the second portion thereof, and concurrently provides the nail a force in a direction for the latched state.

8. The module as claimed in claim 1, wherein the metallic fitting is a leaf spring which has a bended portion with the hole, and a fixing L-shaped portion which engages with a projecting portion provided in the nail at a coupling portion with the bended portion and is deformed so that the bended portion approaches a straight line when the tab is pulled, thereby performing the conversion through the projecting portion.

9. The module as claimed in claim 8, wherein the leaf spring provides the nail a force in a direction for the latched state through the L-shaped portion when the bended portion is restored with the tab is detached with the tab being detached.

10. The module as claimed in any one of claims 1–9, wherein the projecting portion is a pin which is a screw or a press-fitting pin penetrating from both outsides to an inside of the tab.

11. The module as claimed in claim 1, wherein the case has a connector fitting portion, and the tab is fitted in the case so as to enclose the fitting portion, whereby the connector is connectable to electronic circuits in the case through the fitting portion.

12. A module comprising:
a nail going in/out of a case in order to put the module in a latched state with a mounting device;
a tab which is pulled to disengage a latch between the nail and the mounting device and has holes on both sides for the pulling; and
a metal fitting held in a ditch structure provided in the case; wherein
the metal fitting has projecting portions loosely engaging in the holes in a plate member longer than a length of the holes, and converts a force component in a direction of pulling the tab through the projecting portion into a force component in a direction substantially perpendicular to the pulling direction to be provided to the nail, thereby disengaging the module from the latched state with the mounting device.

* * * * *